United States Patent [19]

Teutsch

[11] Patent Number: 5,779,961
[45] Date of Patent: Jul. 14, 1998

[54] METHOD OF MAKING A FIBER REINFORCED THERMOPLASTIC EXTRUSION

[75] Inventor: Erich Otto Teutsch, Richmond, Mass.

[73] Assignee: General Electric Company, Pittsfield, Mass.

[21] Appl. No.: 690,444

[22] Filed: Jul. 26, 1996

[51] Int. Cl.⁶ .................................................. B28B 3/20
[52] U.S. Cl. ............................ 264/176.1; 264/211.21
[58] Field of Search .......................... 264/171.1, 176.1, 264/211.21; 428/394, 395, 396

[56] References Cited

U.S. PATENT DOCUMENTS 3,399,107  8/1968  Biskup et al.
4,439,387  3/1984  Hawley ................................. 264/108
4,492,063  1/1985  Schock et al. ....................... 52/309.7
4,883,552  11/1989  O'Connor et al. ................... 156/180

*Primary Examiner*—Christopher Raimund

[57] ABSTRACT

A process for making a resin extruded lineal profile structure is disclosed. The profile extends in an axial direction and has a plurality of continuous discrete fiber bundles radially spaced apart and extending longitudinally substantially along the entire length of the structure. A thermoplastic resin directly contacts the respective fiber bundles along the length thereof.

7 Claims, 1 Drawing Sheet

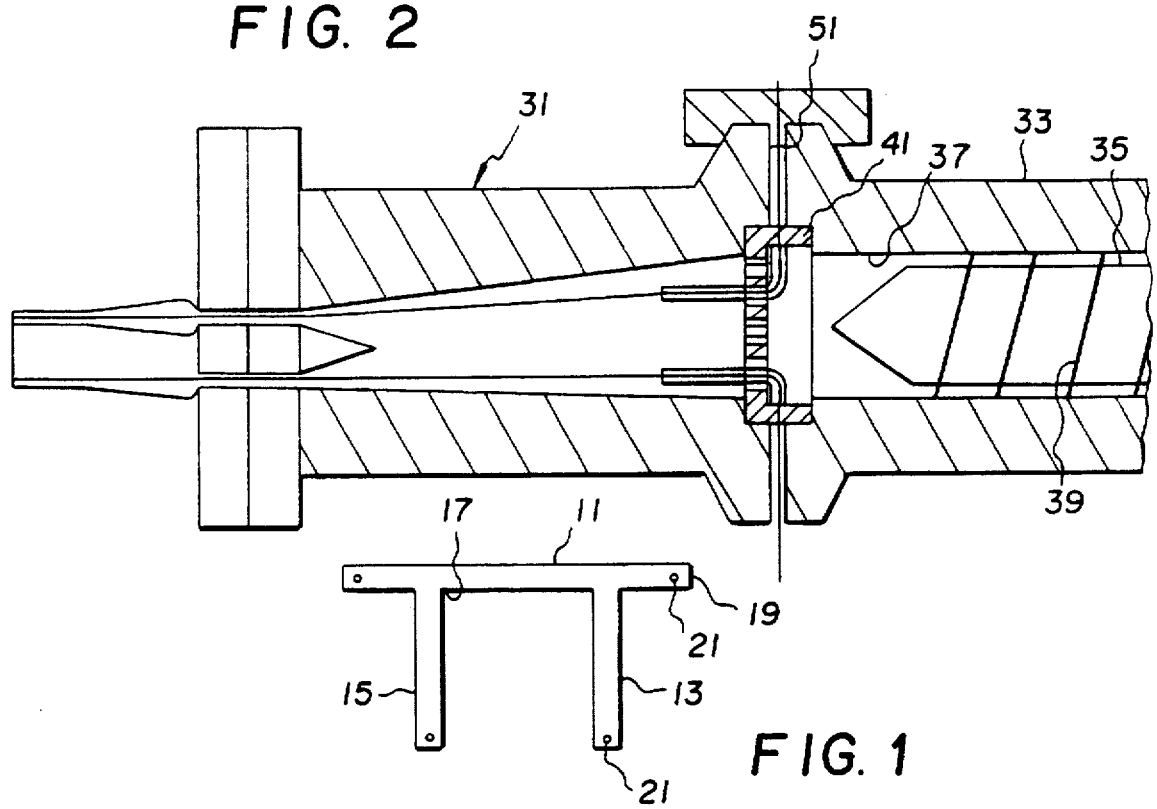
FIG. 2
FIG. 1
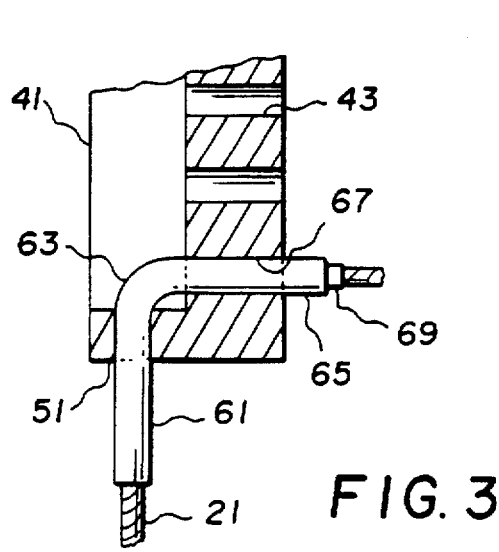
FIG. 3
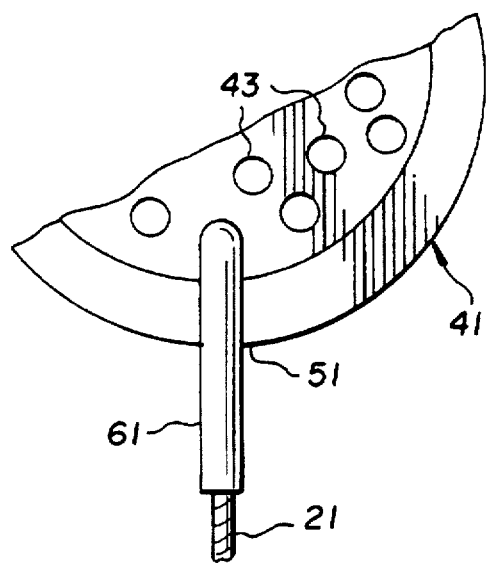
FIG. 4

5,779,961

METHOD OF MAKING A FIBER REINFORCED THERMOPLASTIC EXTRUSION

FIELD OF INVENTION

The present invention relates to an extruded thermoplastic material and having continuous fiber reinforcement and a process for its preparation.

BACKGROUND OF THE INVENTION

Thermoplastics have long been reinforced with fibers for strength and to reduce CTE. This has generally been accomplished by compounding the resin with the fiber to provide good dispersion of the fibers in the resin matrix and good wet-out between the fibers and the resin matrix. Unfortunately, the process causes considerable attrition of fiber length. Additional attrition of fiber length can also occur during injection molding into the final article. Although long fibers and especially continuous fibers, are much more efficient at reinforcing the resin matrix, introduction of the fibers during the molding stage results in the low length/diameter ratio and resulting high stiffness and low impact strength.

U.S. Pat. No. 4,883,552 to O'Connor et al describes a pulltrusion process and apparatus. Typically, in pulltrusion, a glass fiber roving is pulled from a creel and passed through a liquid polyester resin bath for impregnation of the roving with the resin. The roving with resin is subjected to final shaping and curing in a heated die. A puller is located in the process after the curing die for causing the roving to be pulled through the system. As set forth in the patent, the pulltrusion process has been used with difficulty with thermoplastic resins as the matrix material. According to the process disclosed, creels of continuous fiber rovings are pulled through a slurry bath for impregnation with resin particles followed by passage through a die for fusion of the resin particles into a continuous thermoplastic matrix.

Pulltrusion of fiber bundles provides a continuous fiber reinforced resin matrix, but with severe limitations in shape, rate and resin choice. The softened resin has to be of extremely low viscosity in order to wet the individual fibers. The fibers have to be manipulated with great care to assure exposure of the fiber surface to the resin. The low viscosity requirement makes it necessary to use very high fiber to resin ratios of about six to 1 or greater. In addition most low viscosity resins are of the thermoset type requiring long residence times in an oven after the entrainment to cure the resin. These factors make pulltrusion a very slow process compared to thermoplastic extrusion. The advantages of pulltrusion are a very high unidirectional stiffness and strength, but with no post formability, weldability, or recycleability. The process is used for production of such items as ladder rails and wrungs, light construction "I" beams and other such applications where the exceptionally high modulus and unidirectional strength are paramount U.S. Pat. No. 4,492,063 to Schock et al describes a profiled strip for butt welded window frames of a thermoplastic material having reinforcement fibers which have been impregnated with synthetic resin and bonded to the profiled body. The bonding agent is the type that the hardening of the resin is triggered during a subsequent heat treatment. Bonding agents with cross linking are described. The subsequent welding feature is used for butt welding the strips.

U.S. Pat. No. 4,439,387 to Hawley describes a composite structure where fibers are first embedded by extrusion into a closely bundled core. The core is then embedded into the final article.

Hence, it desirable to provide for an improved lineal structure and process for introducing a continuous, reinforcing fiber into a thermoplastic extruded article to provide enhanced stiffness, tensile strength, and dimensional stability.

SUMMARY OF THE INVENTION

It is an object of the present invention to provide an extruded lineal structure having a low volume percent of reinforcing fiber.

It is an object of the present invention to provide an extruded lineal structure having continuous imbedded fibers for strengthening the structure.

In accordance with the present invention, there is provided a thermoplastic resin extruded lineal profile structure extending in an axial direction and having a plurality of continuous discrete fiber bundles directly contacting the resin and extending longitudinally substantially along the entire length of the structure and being spaced radially apart for reinforcing the extruded profile. Preferably the fiber bundles are discrete with individual continuous fibers being in contact such as by twisting or by being closely adjacent so that individual fibers contact the resin and are held in place by direct contact with the resin. The structure of the present invention is particularly suited for base resins of a crystalline polymer having a low melt viscosity.

Also, provided is a process for continuously extruding a fiber reinforced thermoplastic lineal profile structure of the type having a predetermined cross sectional profile extending in the longitudinal direction. The process comprises feeding a melted thermoplastic material into a die having an inlet for receiving melted thermoplastic material and an outlet having a shape corresponding to said desired cross sectional profile. The outlet is positioned downstream of the inlet whereby a stream of melted thermoplastic resin under pressure flows from said inlet to said outlet. A plurality of fiber bundles are introduced into the stream at predetermined spaced apart radial positions for providing fiber reinforcement to the lineal profile at spaced apart locations. The bundles of fiber reinforcement extends in the longitudinal direction at predetermined locations in the profile.

DESCRIPTION OF THE DRAWINGS

FIG. 1 is a cross section of a lineally extruded body.

FIG. 2 is a schematic illustration of in cross section of an extrusion machine that may be apparatus that may be utilized to produce the linear extruded article shown in cross section in FIG. 1.

FIG. 3 is a partial cross-sectional view of the fiber positioning member shown in FIG. 1.

FIG. 4 is a side elevational view of the fiber positioning member shown in FIG. 3.

DESCRIPTION OF THE PREFERRED EMBODIMENT

Lineal extruded articles have a variety of cross sectional shapes depending on the use. FIG. 1 shows the cross section of lineal extruded structure having centrally extending wall portion 11 and depending wall portions 13 and 15 in the form of perpendicularly extending flanges. The lineal profile illustrated includes at least one wall portions intersecting to form a cross sectional profile having corner portions 17 and end portions 19. It is contemplated that the cross-section can comprise curved sections. The lineal structure is desirably utilized as a frame for an opening in a building. Channel type structures may be utilized to hold stationary or moveable panels, as for example, a window pane or door.

The thermoplastic materials that can be employed in profile structure should be suitable for the geographical region in which the profile, when converted into a building product, would be used or depending upon the building code for the region. Preferably, the thermoplastic materials are high temperature thermoplastics such as acrylonitrile-butadiene-styrene (ABS), polycarbonate, polycarbonate/ABS blend, a co-polycarbonate-polyester, acrylic-styrene-acrylonitrile (ASA), acrylonitrile-(ethylene-propylene diamine modified)-styrene (AES), polyalkylene terephthalate such as polybutylene terephthalate (PBT) or polyethylene terephthalate (PET) or blends thereof, blends of polyphenylene ether/polyamide (NORYL GTX Registered TM from General Electric Company), blends of polycarbonate/polybutylene terephthalate and impact modifier (XENOY Registered TM resin from General Electric Company), blends of polycarbonate/PBT/PET, etc., or blends thereof with other additives such as fillers, impact modifiers, pigments, stabilizer, reinforcing agents, etc. It is contemplated that PVC can also be use.

Preferably materials are the crystalline polymers having a low melt viscosity. With polymers of low melt viscosity, the fibers may be used to support the polymer melt which may otherwise not have sufficient melt strength for profile extrusion. Polyamides and polyesters are preferred. The polyamides useful in the present invention are well-known in the art. Specific examples of polyamides are polyamide-6, polyamide-6,6, polyamide-11, polyamide-12, polyamide-6, 3, polyamide-6,4, polyamide-6,10 and polyamide-6,12, as well as polyamides prepared from terephthalic acid and/or isophthalic acid and trimethylhexamethylenediamine; from adipic acid and m-xylylenediamines; from adipic acid, azelaic acid 2,2-bis-(p-aminocyclohexyl) propane, and from terephthalic acid and 4,4'-diaminodicyclohexylmethane. Mixtures and/or copolymers of two or more of the foregoing polyamides or prepolymers thereof, respectively, are also within the scope of the present invention.

Suitable polyester components include crystalline polyesters such as polyesters derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

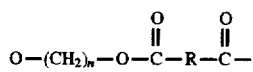

wherein n is an integer of from 2 to 6. R is a $C_6-C_{20}$ aryl radical comprising a decarboxylated residue derived from an aromatic dicarboxylic acid.

The structure includes a plurality of continuous discrete twisted fiber bundles 21 extending longitudinally substantially along the entire length of the structure along a longitudinal axis. The fibers 21 are positioned adjacent to and interior to at least one of the corner portions 17 or the end portions 19. The respective fiber bundles 21 are positioned for enhancing the longitudinal rigidity of the profile. Preferable a plurality of fiber bundles 21 are positioned at spaced apart locations, for instance at corner or end locations so that torsional stress as well as bending stresses are resisted. As the structure is subjected to an exterior force, a bending movement tends to elongate the imbedded fiber. Fiber elongation is resisted by tension on the fiber thereby enhancing the strength of the structure.

Preferably the thermoplastic material has a higher coefficient of thermal expansion (CTE) than the coefficient of thermal expansion of the fiber material so that the thermoplastic material shrinks around the fiber material causing compressive stresses which grip the fiber material and hold it in place. The extruded thermoplastic material directly contacts the respective fiber bundles 21 so that the fiber is held in place without the necessity of a bonding or gluing agent. Since the fibers are initially under compression, the resin shows little reinforcement until the resin has elongated sufficiently to overcome the compression of the fibers. At this point, the fibers' tensile strength and elongation come into play and dominate the response to the strain until the fibers break. When a fiber bundle is used, the fibers in the bundle tend to break randomly and not the whole bundle at a time so as to soften the shock.

A preferred materials for the fibers are glass, graphite or carbon, metal materials, especially conductive metals drawn into wire, and polyamide polymers characterized by the presence of the amide group, —CONH. The preferred polyamides for this invention are polyamide-6; 6,6; 11 and 12, with the most preferred being polyamide-6,6. Kevlar® polyamide fiber of Du Pont de Nemours is preferred for its extremely high tensile strength and great resistance to elongation. The preferred fibers which have a significantly lower coefficient of thermal expansion (CTE) than the thermoplastic matrix resin are under compression once the thermoplastic resin has cooled.

In addition, because of the rigidity of the profile or structure of this invention compared to conventional thermoplastic structures for windows and doors, less thermoplastic material can be used for comparable rigidity. Also, conventional reinforcement techniques such as with short glass fiber which is difficult to extrude is not needed. Less material may be achieved due to reinforced wall sections while maintaining comparable rigidity as well as resistance to twisting or buckling.

It is preferred that the volume percent of fiber to the total volume percent of material is less than about 15 percent volume fiber and more preferably less than about 10 percent volume fiber with volume percents from 1 to 5 percent being preferred. The volume percent can be calculated by comparing the total area of the cross section with the cross sectional area of the fibers. In accordance with the present invention, a small volume percent of fiber reinforcement greatly enhances the rigidity of the final lineal article.

FIG. 2 is illustrative of a standard extrusion molding machine. The extruder 31 has a housing 33 having a central opening with a helical screw 35 mounted for rotation along an axis interior a barrel portion 37. At one end of the opening, a hopper (not shown) is utilized for feeding material to be extruded into the rear portion of the screw 35. Helical threads 39 mounted on the screw 35 are positioned for moving material from the rear portion of the screw 35 to a forward portion. As the material or feedstock is conveyed along the screw 35, it is heated by frictional forces caused by rotation of the screw 35. It is also contemplated that an external heating source such as an electrical resistant heater may be provided to heat the feedstock.

At the forward end of the barrel and spaced from the forward end of the screw, a gate or breaker plate 41 is mounted transverse to the flow of feedstock. The gate 41 is illustrated in more detail in FIG. 3 and FIG. 4. The gate serves as a means for positioning the respective fiber bundles 21 at a predetermined radial location. As illustrated in FIG. 4, the gate includes a plurality of openings 43 for the passage of feedstock. The gate 41 acts to create a back pressure which contributes to the mixing and heating of the feedstock and also serves to filter impurities from the feedstock.

A die body 45 which is mounted on the forward end of the housing 33. The mounting is conventionally made by bolting or clamping a flange on the die body 45 to a flange on the housing 33. As illustrated in FIG. 2. the gate 41 is mounted in place in a recess 47 between housing 33 and the die body 45. The die body 45 includes a tapered central and axially aligned opening which throttles the feedstock. At the die outlet a die plate 59 has an opening with the desired cross sectional shape of the lineal profile to be extruded. Typically pressures within the extruder is in excess of 2,000 lbs/sq. inch, and is preferably from 3,000 to 2,000.lbs/sq. inch.

In accordance with the present invention, a fiber bundle 49 is introduced into the central opening in the extruder 31 into the path of melted flowing feedstock at a predetermined position for providing fiber reinforcement to at least one of said corner portions or said end portions whereby said fiber reinforcement extends in the longitudinal direction at a predetermined radial location in the profile. As illustrated in FIG. 2, a fiber feed opening 51 extends through intermediate flange area of the die body 45 and housing 33. As illustrated in FIG. 3, the fibers 21 are fed through respective guide tubes 61 and ceramic bushing or inserts 69, which act to reduce wear on the tubing 61 as the fibers are fed through opening 51. The guide tubes 61 which is preferable a stainless steel metal provides for the change in direction for the feeding of the fiber bundle 21 from a direction transverse to the flow of material to a direction along the flow of material in the extruder. Opening 51 which extends through the outer peripheral surface of the gate 41 in a radial direction bends at 63 interior the gate 41 and extends in the axial direction along a straight section 65 so as to properly position the respective fiber bundles in the radial direction for enforcement of the lineal extrusion. Straight section 61 is held in place by frictional engagement with axially extending opening or bore 51 in the gate 41. Bore 67 may be oversized to permit polymer melt to flow around tube 65. Bore 67 has the desired radial alignment to position the fiber in the lineal extrusion. To provide for the smooth transition of the fiber bundle 21 into the melted resin, a ceramic insert 69 having an orifice is mounted in the end of the tube 61 to guide the fiber into the stream of molten resin. The ceramic insert 69 has an orifice which has a diameter sufficiently large so as permit the respective fiber bundles 21 to freely exit the respective tubes 61 but sufficiently small so that resin which is under pressure in the die 31 is prevented from flowing through tube 61. The effect of the fiber 21 being drawn out of the tube 61 counters the pressure in the extruder to resist flow of melted resin through the tube. The outlet of the guide tube 61 is positioned so that the fiber bundle is properly aligned for reinforcement at the proper position in cross sectional profile of the opening in the die. The preferred positions for reinforcement are corner and end positions, but is highly design specific.

According to the process, thermoplastic resin is introduced into a hopper as feedstock. The material is conveyed and heated inside the barrel by the screw to form a molten mixture. A fiber bundle is continuously feed into the molten mixture from reel of fiber into the proper position interior the extruder through a guide tube. As the fibers approach the exit of the tube and come in contact with he melt, the pressure is suddenly increased from atmospheric pressure to the pressure of the melted feedstock, which may be on the order of 5,000 psi. The sudden compression forces all of the air back through the tube leaving a tightly compressed fiber bundle with only the surface of the bundle exposed to the melt The fiber bundle exits the tube in the proper position and alignment for profile reinforcement. As the melt exits the die opening, the molten mixture of thermoplastic resin cools and shrinks around the bundle providing a tight grip on the fibers. Fibers at the center of the bundle may not be in contact with any resin and may pull out when broken so as to provide a yield point different than the fibers at the surface of the bundle which are encased in the thermoplastic resin.

This procedure was tested using a Davis Standard single screw extruder, glass fiber bundles. Kevlar® cord of two different fiber counts in up to six location in CYCOLAC® ABS resin, Lexan® polycarbonate resin, and Valox® PBT resin, all from General Electric Company, with up to twenty four individual bundles in a profile extrusion with excellent results. In the above test, the weight percent of fiber reinforcement was from about 2 to about 6 percent and the volume percent at these weight percents was calculated to be from about 1 to about 3 volume percent The fibers were threaded through metal tubes and the ceramic insert at the proper location. One of the profiles utilized is illustrated in FIG. 1. The fibers were drawn into the melt continuously as the extrusion proceeded without any real indication of polymer melt back-flow through the feed tube. Also, during the above test, ceramic inserts having a plurality of openings, i.e. four was utilized so that a plurality of closely adjacent but spaced apart fibers could be utilized at a single location. Since the threading of fibers is difficult and time consuming, it is contemplated that a split breaker plate could be utilized with one portion of the plate being utilized to position fibers and having tapered openings to help guide the fiber through the opening.

I claim:

1. A process for continuously extruding a fiber reinforced thermoplastic lineal profile structure having a predetermined cross sectional profile having at least one of a corner portion or end portion, said structure extending in the longitudinal direction, said process comprising feeding a thermoplastic material into an extruder having an inlet for receiving melted thermoplastic material and an outlet having a shape corresponding to said desired cross sectional profile, said outlet being positioned downstream of said inlet whereby a stream of melted thermoplastic resin under pressure flows from said inlet to said outlet, introducing a plurality of fiber bundles into said stream at predetermined spaced apart positions with at least one fiber bundle being positioned at said corner or end portion for providing fiber reinforcement to said lineal profile at spaced apart locations whereby said bundles of fiber reinforcement extend in the longitudinal direction at a predetermined location in said profile, said extruder includes means mounted transverse to the flow of said stream for positioning said fiber bundles at said spaced apart positions, said process being carried out with the volume percent of fiber to the total volume percent of material is less than about 15 percent volume fiber, said percent being calculated by comparing the total area of the cross section with the cross sectional area of the fibers, said thermoplastic material has a higher coefficient of thermal expansion than the coefficient of thermal expansion of the fiber material so that the thermoplastic material shrinks around the fiber material causing compressive stresses which grip the fiber material and hold it in place, said means mounted traverse to the flow comprises a plate means including a plurality of openings and a plurality of guide tubes positioned in respective openings, said fiber bundles being fed through said guide tubes during extruding.

2. A process according to claim 1 wherein said wherein said fiber bundles comprise twisted continuous fibers or closely spaced adjacent continuous fibers.

3. A process according to claim 2 wherein said thermoplastic resin is a crystalline resin having a low melt viscosity.

4. A process according to claim 3 wherein said fibers are materials selected from the group consisting of glass, carbon, metals, ceramic, mineral, and polyamide polymers.

5. A process according to claim 4 wherein said structure is extruded at pressures in excess of 2,000 lbs/sq. inch.

6. A process according to claim 1 wherein the volume percent of fiber to the total volume percent of material is less than about 10 percent volume fiber, said percent being calculated by comparing the total area of the cross section with the cross sectional area of the fibers.

7. A process according to claim 1 wherein the volume percent of fiber to the total volume percent of material is from about 1 to about 5 percent volume fiber, said percent being calculated by comparing the total area of the cross section with the cross sectional area of the fibers.

* * * * *